United States Patent
Huang et al.

(10) Patent No.: US 10,155,883 B2
(45) Date of Patent: Dec. 18, 2018

(54) SILICONE RELEASE COATING COMPOSITION AND LOW RELEASE FORCE EMULSION SILICONE RELEASE COATING FOR FILMS AND PAPERS HAVING CURED RELEASE COATING

(71) Applicants: Dow Corning Corporation, Midland, MI (US); Dow Corning (China) Holding Co., Ltd., Shanghai (CN)

(72) Inventors: Fuming Huang, Shanghai (CN); Chung Mien Kuo, Chungli (TW); Yang Wang, Shanghai (CN)

(73) Assignees: Dow Silicones Corporation, Midland, MI (US); Dow (Shanghai) Holding Co., Ltd., Shanghai (CN)

( * ) Notice: Subject to any disclaimer, the term of this patent is extended or adjusted under 35 U.S.C. 154(b) by 102 days.

(21) Appl. No.: 15/321,299

(22) PCT Filed: Jun. 27, 2014

(86) PCT No.: PCT/CN2014/080924
§ 371 (c)(1),
(2) Date: Dec. 22, 2016

(87) PCT Pub. No.: WO2015/196440
PCT Pub. Date: Dec. 30, 2015

(65) Prior Publication Data
US 2017/0145256 A1 May 25, 2017
US 2017/0355878 A9 Dec. 14, 2017

(51) Int. Cl.
| | | |
|---|---|---|
| *C09D 183/04* | (2006.01) | |
| *C09D 5/02* | (2006.01) | |
| *D21H 19/12* | (2006.01) | |
| *C08G 77/12* | (2006.01) | |
| *C08G 77/20* | (2006.01) | |
| *C08G 77/00* | (2006.01) | |

(52) U.S. Cl.
CPC .......... *C09D 183/04* (2013.01); *C09D 5/022* (2013.01); *D21H 19/12* (2013.01); *C08G 77/12* (2013.01); *C08G 77/20* (2013.01); *C08G 77/80* (2013.01)

(58) Field of Classification Search
None
See application file for complete search history.

(56) References Cited

U.S. PATENT DOCUMENTS

| | | |
|---|---|---|
| 2,823,218 A | 2/1958 | Speier et al. |
| 3,159,601 A | 12/1964 | Ashby |
| 3,159,662 A | 12/1964 | Ashby |
| 3,220,972 A | 11/1965 | Lamoreaux |
| 3,296,291 A | 1/1967 | Chalk et al. |
| 3,419,593 A | 12/1968 | Willing |
| 3,445,420 A | 5/1969 | Kookootsedes et al. |
| 3,516,946 A | 6/1970 | Modic |
| 3,814,730 A | 6/1974 | Karstedt |
| 3,928,629 A | 12/1975 | Chandra et al. |
| 3,960,810 A | 6/1976 | Chandra et al. |
| 4,256,870 A | 3/1981 | Eckberg |
| 4,293,671 A | 10/1981 | Sasaki et al. |
| 4,465,818 A | 8/1984 | Shirahata et al. |
| 4,472,563 A | 9/1984 | Chandra et al. |
| 4,476,166 A | 10/1984 | Eckberg |
| 4,504,645 A | 3/1985 | Melancon |
| 4,533,575 A | 8/1985 | Melancon |
| 4,562,096 A | 12/1985 | Lo et al. |
| 4,774,111 A | 9/1988 | Lo |
| 4,783,552 A | 11/1988 | Lo et al. |
| 4,791,029 A | 12/1988 | Fau et al. |
| 4,870,149 A | 9/1989 | Hara et al. |
| 4,954,554 A | 9/1990 | Bunge |

(Continued)

FOREIGN PATENT DOCUMENTS

| | | |
|---|---|---|
| CA | 1129270 A | 8/1982 |
| CN | 101531868 A | 9/2009 |

(Continued)

OTHER PUBLICATIONS

Gelest catalog, Reactive silicones, 64 pages, 2004. (Year: 2004).*

(Continued)

*Primary Examiner* — Robert S Loewe
(74) *Attorney, Agent, or Firm* — Warner Norcross & Judd LLP

(57) ABSTRACT

A silicone release coating composition comprises:

(A) 100 weight parts of an organopolysiloxane fluid having a viscosity at 25° C. of 50 to 10,000 mPa·s and an alkenyl content of 0.10 to 3.0 wt %;

(B) 0.5-40 weight parts of a diorganopolysiloxane represented by the average structural formula (1):

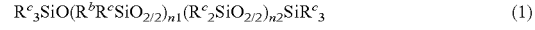

$$R^c{}_3SiO(R^bR^cSiO_{2/2})_{n1}(R^c{}_2SiO_{2/2})_{n2}SiR^c{}_3 \quad (1)$$

wherein $R^b$ is an alkenyl group; $R^c$ is an alkyl group or a phenyl group; n1 provides an alkenyl content of 0.05 to 0.80 wt. %; n2 is at least 1; and n1+n2 provides this component with a viscosity at 25° C. of 5,000 to 150,000 mPa·s;

(C) an organohydrogenpolysiloxane that has a viscosity at 25° C. of 1 to 1,000 mPa·s, at least two silicon-bonded hydrogen atoms in each molecule, and an alkyl group or a phenyl group for its silicon-bonded organic groups;

(D) a hydrosilylation reaction catalyst in a catalytic amount;

(E) a surfactant;

(F) water; and (G) an inhibitor.

17 Claims, No Drawings

(56) References Cited

U.S. PATENT DOCUMENTS

| | | | |
|---|---|---|---|
| 5,036,117 A | 7/1991 | Chung et al. | |
| 5,095,067 A | 3/1992 | Hara et al. | |
| 5,104,927 A | 4/1992 | Hara et al. | |
| 5,108,791 A | 4/1992 | Chung et al. | |
| 5,125,998 A | 6/1992 | Jones et al. | |
| 5,391,673 A | 2/1995 | Ekeland et al. | |
| 5,468,824 A | 11/1995 | Togashi et al. | |
| 5,486,578 A | 1/1996 | Carpenter, II et al. | |
| 5,500,148 A * | 3/1996 | Ohba | C08K 5/09 428/452 |
| 5,529,822 A | 6/1996 | Togashi et al. | |
| 5,741,439 A * | 4/1998 | Armstrong | C08L 83/04 516/53 |
| 5,777,017 A | 7/1998 | Funk et al. | |
| 8,779,074 B2 * | 7/2014 | Irifune | C09J 183/04 525/477 |
| 2002/0123569 A1 * | 9/2002 | Koyama | C08K 5/02 525/100 |
| 2003/0180468 A1 | 9/2003 | Cray et al. | |
| 2005/0059776 A1 | 3/2005 | Cray et al. | |
| 2006/0093835 A1 | 5/2006 | Ito | |
| 2007/0203307 A1 | 8/2007 | Cavaleiro et al. | |
| 2007/0289495 A1 | 12/2007 | Cray et al. | |
| 2010/0255205 A1 * | 10/2010 | Cray | C08K 5/541 427/386 |
| 2011/0165206 A1 | 7/2011 | Liu et al. | |
| 2011/0287267 A1 | 11/2011 | Hori et al. | |
| 2013/0330562 A1 | 12/2013 | Irifune et al. | |

FOREIGN PATENT DOCUMENTS

| | | |
|---|---|---|
| CN | 102046139 A | 5/2011 |
| CN | 102224188 A | 10/2011 |
| CN | 103484017 A | 1/2014 |
| EP | 0644246 B1 | 11/1999 |
| EP | 1323796 A2 | 7/2003 |
| EP | 1826243 A2 | 8/2007 |
| EP | 2631277 A1 | 8/2013 |
| FR | 2450642 A1 | 10/1980 |
| JP | S55110155 A | 8/1980 |
| JP | S61159480 A | 7/1986 |
| JP | S61264052 A | 11/1986 |
| JP | H06057144 A | 3/1994 |
| JP | H11222557 A | 8/1999 |
| JP | 200164390 A | 3/2001 |
| JP | 2002356667 A | 12/2002 |
| JP | 2003128925 A | 5/2003 |
| JP | 2003192896 A | 7/2003 |
| JP | 2004504437 A | 2/2004 |
| JP | 2004307691 A | 11/2004 |
| JP | 2005255928 A | 9/2005 |
| JP | 2006152265 A | 6/2006 |
| JP | 2008520804 A | 6/2008 |
| JP | 2008179782 A | 8/2008 |
| JP | 2010150537 A | 7/2010 |
| JP | 2012092167 A | 5/2012 |
| JP | 2013253176 A | 12/2013 |
| WO | WO2008084747 A2 | 7/2008 |

OTHER PUBLICATIONS

English language abstract and machine translation for JPS61159480 (A) extracted from http://worldwide.espacenet.com database on Mar. 15, 2018, 10 pages.

English language abstract and machine translation for JPS61264052 (A) extracted from http://worldwide.espacenet.com database on Mar. 15, 2018, 10 pages.

English language abstract and machine translation for JPH06057144 (A) extracted from http://www.j-platpat.inpit.go.jp database on Mar. 16, 2018, 8 pages.

English language abstract and machine translation for JPH11222557 (A) extracted from http://worldwide.espacenet.com database on Mar. 15, 2018, 11 pages.

English language abstract and machine translation for JP2002356667 (A) extracted from http://worldwide.espacenet.com database on Mar. 15, 2018, 14 pages.

English language abstract and machine translation for JP2003128925 (A) extracted from http://worldwide.espacenet.com database on Mar. 15, 2018, 14 pages.

English language abstract and machine translation for JP2004307691 (A) extracted from http://worldwide.espacenet.com database on Mar. 15, 2018, 11 pages.

English language abstract and machine translation for JP2005255928 (A) extracted from http://worldwide.espacenet.com database on Mar. 15, 2018, 14 pages.

English language abstract and machine translation for CN101531868 (A) extracted from http://worldwide.espacenet.com database on Mar. 16, 2018, 39 pages.

English language abstract and machine translation for JP2012092167 (A) extracted from http://worldwide.espacenet.com database on Mar. 15, 2018, 42 pages.

PCT/CN2014/080924 International Search Report dated Apr. 3, 2015, 3 pages.

* cited by examiner

SILICONE RELEASE COATING COMPOSITION AND LOW RELEASE FORCE EMULSION SILICONE RELEASE COATING FOR FILMS AND PAPERS HAVING CURED RELEASE COATING

CROSS-REFERENCE TO RELATED APPLICATIONS

This application is the National Stage of, and claims priority to and all advantages of, International Application No. PCT/CN2014/080924 filed on 27 Jun. 2014, the content of which is hereby incorporated by reference.

TECHNICAL FIELD

The present invention relates to an emulsion composition for the silicone release coating application. The release coating composition is applied to coat a layer on films or paper substrate and cured under thermal addition to form a coated substrate. The invention is intent to provide a coated release liner with low release force for tape release, sticky adhesive or label release application. In particular, the present invention relates to a silicone release coating composition, a low release force emulsion silicone release coating for films and papers yielded by curing the silicone release coating composition, and a production method of a low release force emulsion silicone release coating for films and papers.

BACKGROUND ART

Conventionally, an emulsion (EM) type silicone release coating has short chain vinyl-end silicone polymers or multiple vinyl functional silicone polymers to get fast cure with acceptable migration and also easy to be emulsified, so the base polymers have to be low viscosity to meet the manufacture process requirement. The coating is, however, difficult to provide low release force due to high cure density.

For example, U.S. Pat. No. 4,791,029A (Patent Reference 1, incorporated herein for reference) discloses aqueous emulsions of crosslinkable polyaddition organopolysiloxane compositions, comprising: a first aqueous emulsion A including end-vinylated polysiloxanes, a vinylated cyclotrisiloxane, a hydroorganodiorganopolysiloxane, a polyvinyl alcohol and a polyalkylene glycol alkyl ether or alkylphenyl ether, and a second aqueous emulsion B which comprises a catalytically effective amount of a platinum metal catalyst with siloxane polymer. The emulsions are said to be well adapted for the thin layer coating of flexible substrates to impart water-repellency and nonadherency thereto.

For example, U.S. Pat. No. 4,954,554A (Patent Reference 2, incorporated herein for reference) discloses aqueous emulsions of curable silicone compositions which provide cured coatings having improved gloss and/or water-repellancy and/or adhesive release if formulated to contain polyvinylachohol (PVA) having a degree of hydrolysis of 90 mol. % or more. The extent of improvement is directly related to the degree of hydrolysis of the PVA. PVA having an average degree of hydrolysis of from 94 to 99 mol. % is particularly effective for improving these properties of cured coatings. Conveniently, a mixture of two or more commercially available PVAs having different degrees of hydrolysis can be used to arrive at a PVA having a desired degree of hydrolysis.

For example, U.S. Pat. No. 5,095,067A (Patent Reference 3, incorporated herein for reference) discloses a release silicone emulsion composition comprising: (A) 100 parts by weight of a specific organovinylpolysiloxane; (B) from 1 to 50 parts by weight of a specific organohydrogenpolysiloxane; (C) from 0.5 part to 5 parts by weight of a platinum catalyst having a viscosity of 10 cSt or less at 25° C.; (D) from 1.5 to 15 parts by weight of a nonionic emulsifying agent having an average HLB of from 10 to 20, pH of 6.5 or less and an ionic conductance of 30 μS/cm or less; and (E) water. This composition is said to have good pot life and curability. The cured film had good release properties and residual adhesive properties of adhesives.

For example, U.S. Pat. No. 5,777,017A (Patent Reference 4, incorporated herein for reference) discloses aqueous organopolysiloxane emulsions, especially those which can be crosslinked by addition of Si-bonded hydrogen onto aliphatic multiple bond, their preparation with an emulsifier combination comprising alkylphenyl polyglycol ether and polyvinyl alcohol with a low degree of hydrolysis, and their use for preparing anti-adhesive coatings.

For example, US 20110287267A1 (Patent Reference 5, incorporated herein for reference) discloses a solventless cured release coating-forming organopolysiloxane composition having a viscosity at 25° C. of 50 to 2,000 mPa·s comprising (A) 100 weight parts of an alkenyl-functional diorganopolysiloxane that has a viscosity of 25 to 1,000 mPa·s; (B) 0.5 to 15 weight parts of a diorganopolysiloxane that has a viscosity of at least 10,000 mPa·s and that has an aliphatically unsaturated group content of no more than 0.1 mole %; (C) 0.5 to 5 weight parts of a branched organopolysiloxane that has more than one $SiO_{4/2}$ unit and that is a polymer product provided by an equilibration polymerization between a branched organosiloxane oligomer represented by the average siloxane unit formula (1) $(SiO_{4/2})(R^aR^b{}_2SiO_{1/2})_x$ and a diorganosiloxane oligomer; (D) a specific amount of an organohydrogenpolysiloxane that has a viscosity of 1 to 1,000 mPa·s; and (E) a hydrosilylation reaction catalyst in a catalytic quantity. The resulting cured coating is said to exhibit an excellent release performance to tacky substances and a smooth slipperiness.

For example, U.S. Pat. No. 4,870,149A (Patent Reference 6, incorporated herein for reference) discloses a solventless, cured release coating-forming organopolysiloxane composition comprising (A) 100 parts of an organopolysiloxane fluid having a branched structure and comprising (i) the siloxane unit represented by the formula $SiO_{4/2}$, (ii) the siloxane unit represented by the general formula $R_2SiO_{2/2}$, and (iii) the siloxane unit represented by the general formula $RaR_2SiO_{1/2}$; (B) 0.5 to 15 parts of a diorganopolysiloxane with the average structural formula $R^aR^c{}_2SiO(R^bR^cSiO_{2/2})_{n1}(R^c{}_2SiO_{2/2})_{n2}SiR^c{}_2R^a$; (C) a prescribed quantity of an organohydrogenpolysiloxane; and (D) a hydrosilylation reaction catalyst. Also, a sheet-form substrate has a cured coating from this solventless, cured release coating-forming organopolysiloxane composition.

However, the above Patent References 1-6 fail to well solve the above technical problem of the prior art. Particularly, Patent References 1-4, which relate to aqueous emulsions, cannot provide a low release force emulsion silicone release coating; and Patent References 5-6, which relate to solventless, cured release coating-forming organopolysiloxane composition, obviously cannot meet the requirement on aqueous emulsions.

Therefore, there still exists a need in the art for obtaining an aqueous emulsion type silicone release coating composition which can provide a lower release force at same coat weight (CW) to sticky adhesive and possessing excellent properties including high-speed cure, cured layer with low migration, slippery & good smooth touch of the coating surface, and good anchorage to the substrate.

SUMMARY OF THE INVENTION

The present invention was pursued in order to solve the problems cited above and has as an object the introduction of a low release force emulsion silicone release coating application. The release coating composition is applied to coat a layer on films or paper substrate and cured under thermal addition to form a coated substrate. Another object of the present invention is to provide a coated release liner with low release force for tape release, sticky adhesive or label release application.

To overcome the above existing defect, this invention discloses a cured release coating using a certain long chain polysiloxane additive. The additive has high viscosity (5,000 to 150,000 cp) and reactive vinyl functional group, which vinyl functional group pendant on side chain is easily form covalently bonded by hydrosliation with SiH function cross-linker. The terminated group of siloxane additive has no reactive. This invention discloses a silicone release coating composition, comprises: (I) silicone compound comprising vinyl pendant silicone additive for lower release force on a polymer film substrate or paper, wherein the additive is vinyl functional group pendant on side chain with non-reactive group terminated; (II) an organohydrogenpolysiloxane cross-linking agent in an amount such that the ratio of the total number of silicon hydride (Si—H) groups in (II) to aliphatically unsaturated hydrocarbon groups in (I) is from 0.9:1 to 3:1; (III) a sufficient amount of a hydrosilylation catalyst effective to catalyze the reaction between the vinyl siloxane and the cross-linking agent; (IV) surfactants; (V) water; and (VI) inhibitor.

Through compounding of silicone base and additive, the additive together with base polymer form a part cured network on substrate that can provide a lower release force to sticky adhesive. The viscosity of the mixture maintains a reasonable base viscosity suitable for emulsification. The other properties of coating liner keeps as good as base polymer in performance of anchorage testing like Rub Off (RO), delayed RO, Subsequent Adhesive Strength (SAS) and Extractable.

DISCLOSURE OF THE INVENTION

The objects cited above can be achieved by the following:
{1} A silicone release coating composition, comprising:
(A) 100 weight parts of an organopolysiloxane fluid having a viscosity at 25° C. of 50 to 10,000 mPa·s and alkenyl content of 0.10 to 3.0 wt %;
(B) 0.5-40 weight parts of a diorganopolysiloxane represented by the average structural formula (1), having a viscosity at 25° C. of 5,000 to 150,000 mPa·s and alkenyl content of 0.05 to 0.80 wt. %:

$$R^c{}_3SiO(R^bR^cSiO_{2/2})_{n1}(R^c{}_2SiO_{2/2})_{n2}SiR^c{}_3 \quad (1)$$

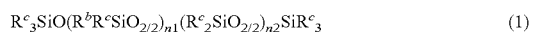

wherein $R^b$ is alkenyl having 2 to 8 carbon atoms; $R^c$ is alkyl group having 1 to 8 carbon atoms or phenyl; n1 is a number that provides alkenyl content of 0.05 to 0.80 wt %; n2 is a number with a value of at least 1; and n1+n2 is a number that provides this component with a viscosity at 25° C. of 5,000 to 150,000 mPa·s;
(C) an organohydrogenpolysiloxane that has a viscosity at 25° C. of 1 to 1,000 mPa·s and that has at least two silicon-bonded hydrogen atoms in each molecule, and has alkyl group having 1 to 8 carbon atoms or phenyl group for its silicon-bonded organic groups, in an amount sufficient to provide a value of 0.8:1 to 5:1 for the molar ratio of silicon-bonded hydrogen atoms in this organohydrogenpolysiloxane to the alkenyl groups in components (A) and (B);
(D) a hydrosilylation reaction catalyst in a catalytic amount;
(E) surfactant,
(F) water; and
(G) inhibitor.
{2} The silicone release coating composition according to {1}, characterized in that alkenyl content of component (B) is preferable within a range of 0.05 to 0.50 wt %.
{3} The silicone release coating composition according to {1}, characterized in that component (A) is 100 weight parts of at least one organopolysiloxane fluid selected from the group consists of: linear organopolysliloxane, branched organopolysiloxane, mixture of organopolysiloxanes having different alkenyl contents of 0.10 to 3.0 wt %, and mixture of linear organopolysliloxane and branched organopolysiloxane.
{4} The silicone release coating composition according to {1}, characterized in that component (A) is a mixture of (A-1) polydimethylsiloxane having alkenyl groups only in its molecular terminals and (A-2) polydimethylsiloxane having alkenyl groups in its molecular terminals and its side-chain positions.
{5} The silicone release coating composition according to {1}, characterized in that component (A) comprises at least one organopolysiloxane fluid having a branched structure and a viscosity at 25° C. of 50 to 10,000 mPa·s, comprising the siloxane units (i) to (iii) described below, and having a straight-chain moiety comprising a plurality of siloxane unit (ii)'s, and a branch point comprising siloxane unit (i), wherein the terminals of the straight-chain moiety are end blocked by the siloxane unit (iii)
(i) the siloxane unit represented by the general formula $SiO_{4/2}$: 1 or more
(ii) the siloxane unit represented by the general formula $R_2SiO_{2/2}$: 15 to 995
(iii) the siloxane unit represented by the general formula $R^aR_2SiO_{1/2}$ in the formulae, $R^a$ is a group selected from the group consisting of alkyl having 1 to 8 carbon atoms, alkenyl having 2 to 8 carbon atoms, phenyl, alkoxy having 1 to 8 carbon atoms, and the hydroxyl group, and R is a group selected from the group consisting of alkyl having 1 to 8 carbon atoms, alkenyl having 2 to 8 carbon atoms, and phenyl, wherein at least 0.10 to 3.0 wt % of the $R^a$ and R in the molecule are alkenyl group having 2 to 8 carbon atoms and at least 50% of the total number of $R^a$ and R in the molecule is alkyl group having 1 to 8 carbon atoms.
{6} The silicone release coating composition according to {5}, characterized in that component (A) comprises at least one organopolysiloxane fluid having a branched structure and represented by the average siloxane unit formula (2):

$$(R^aR_2SiO_{1/2})_4(R_2SiO_{2/2})_m(SiO_{4/2}) \quad (2)$$

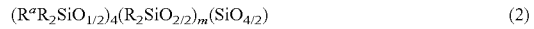

wherein $R^a$ is a group selected from the group consisting of alkyl having 1 to 8 carbon atoms, alkenyl having 2 to 8 carbon atoms, phenyl, alkoxy having 1 to 8 carbon atoms, and the hydroxyl group; R is a group selected from the group consisting of alkyl having 1 to 8 carbon atoms, alkenyl having 2 to 8 carbon atoms, and phenyl; at least 3 wt % of the $R^a$ and R in the molecule are alkenyl having 2 to 8 carbon atoms; at least 50% of the total number of $R^a$ and R in the molecule is alkyl having 1 to 8 carbon atoms; and m=15 to 995.

{7} The silicone release coating composition according to {5}, characterized in that component (A) is an organopolysiloxane having a branched structure and represented by the average siloxane unit formula (3):

$$[(R^bR^c_2SiO_{1/2})_n(R^dR^c_2SiO_{1/2})_{1-n}]_4(R^bR^cSiO_{2/2})_{m1}(R^c_2SiO_{2/2})_{m2}(SiO_{4/2}) \quad (3)$$

wherein $R^b$ is alkenyl group having 2 to 8 carbon atoms; $R^c$ is alkyl group having 1 to 8 carbon atoms or phenyl; $R^d$ is a group selected from the group consisting of alkyl having 1 to 8 carbon atoms, alkoxy having 1 to 8 carbon atoms, and the hydroxyl group; there are at least three $R^b$ in the molecule; at least 50% of the total number of $R^b$, $R^c$, and $R^d$ in the molecule is alkyl having 1 to 8 carbon atoms; n is 0 or 1; m1 is a number with a value of at least 1; m2 is a number with a value of at least 0; and m1+m2=15 to 995.

{8} The silicone release coating composition according to {1}, characterized in that the component (E) comprises at least one nonionic surfactant selected from the group consisting of polyether compounds, polyether-modified silicones, water-soluble polyester compounds, water-soluble polyvinyl alcohols and water-soluble polyvinylacetates.

{9} The silicone release coating composition according to any of {1} to {8}, characterized in the component (G) is a hydrosilylation reaction inhibitor at 0.05-2 weight parts and is noncuring at ambient temperature and cures under the application of heat.

{10} A low release force emulsion silicone release coating for films and papers yielded by curing the silicone release coating composition according to any of {1} to {9}.

{11} A production method of a low release force emulsion silicone release coating for films and papers by applying the silicone release coating composition according to any of {1} to {9} on at least one side of films and papers and cured at a temperature of at least 100° C.

Through the combination between (A) said reactive organopolysiloxane fluid having specific viscosity (50 to 10,000mPa·s) and alkenyl content of 0.1 to 3.0 wt %, (B) diorganopolysiloxane having a viscosity at 25° C. of 5,000 to 150,000 mPa·s, 0.05 to 0.80 wt. % of alkenyl groups and (C) organohydrogenpolysiloxane that has a viscosity at 25° C. of 1 to 1,000 mPa·s and that has at least two silicon-bonded hydrogen atoms in each molecule, the obtained release coating composition can provide a lower release force to sticky adhesive, and the viscosity of the mixture maintains a reasonable base viscosity suitable for emulsification, and perform lower release force at same CW:
i) high-speed cure,
ii) cured layer with low migration,
iii) slippery & good smooth touch of the coating surface, and
 iv) good anchorage to the substrate.
This results in the application use of:
 i) the noise reduction in application stage, and
 ii) protection of operators from friction burn during repeatedly peeling release liner

BEST MODE FOR CARRYING OUT THE INVENTION

The silicone release coating composition of the present invention characteristically comprises (A) 100 weight parts of an organopolysiloxane fluid having a viscosity at 25° C. of 50 to 10,000 mPa·s and alkenyl content of 0.10 to 3.0 wt %;
(B) 0.5-40 weight parts of a diorganopolysiloxane represented by the average structural formula (1), having a viscosity at 25° C. of 5,000 to 150,000 mPa·s and alkenyl content of 0.05 to 0.80 wt %:

$$R^c_3SiO(R^bR^cSiO_{2/2})_{n1}(R^c_2SiO_{2/2})_{n2}SiR^c_3 \quad (1)$$

wherein $R^b$ is alkenyl having 2 to 8 carbon atoms; $R^c$ is alkyl group having 1 to 8 carbon atoms or phenyl; n1 is a number that provides alkenyl content of 0.05 to 0.80 wt %; n2 is a number with a value of at least 1; and n1+n2 is a number that provides this component with a viscosity at 25° C. of 5,000 to 150,000 mPa·s;
(C) 1.5-10 weight parts of an organohydrogenpolysiloxane that has a viscosity at 25° C. of 1 to 1,000 mPa·s and that has at least two silicon-bonded hydrogen atoms in each molecule, wherein the silicon-bonded organic groups are alkyl group having 1 to 8 carbon atoms or phenyl group, in an amount sufficient to provide a value of 0.8:1 to 5:1 for the molar ratio of silicon-bonded hydrogen atoms in this organohydrogenpolysiloxane to the alkenyl groups in components (A) and (B);
(D) a hydrosilylation reaction catalyst in a catalytic amount;
(E) surfactant;
(F) water; and
(G) inhibitor.

Component (A) is 100 weight parts of at least one organopolysiloxane fluid selected from the group consists of: linear organopolysliloxane, branched organopolysiloxane, mixture of organopolysiloxanes having different alkenyl contents of 0.10 to 3.0 wt. %, and mixture of linear organopolysliloxane and branched organopolysiloxane.

Component (A) is a mixture of (A-1) polydimethylsiloxane having alkenyl groups only in its molecular terminals and (A-2) polydimethylsiloxane having alkenyl groups in its molecular terminals and its side-chain positions.

Component (A) comprises at least one organopolysiloxane fluid having a branched structure and a viscosity at 25° C. of 50 to 10,000 mPa·s, comprising the siloxane units (i) to (iii) described below, and having a straight-chain moiety comprising a plurality of siloxane unit (ii)'s, and a branch point comprising siloxane unit (i), wherein the terminals of the straight-chain moiety are end blocked by the siloxane unit (iii)
 (i) the siloxane unit represented by the general formula $SiO_{4/2}$: 1 or more
 (ii) the siloxane unit represented by the general formula $R_2SiO_{2/2}$: 15 to 995
 (iii) the siloxane unit represented by the general formula $R^aR_2SiO_{1/2}$
in the formulae, $R^a$ is a group selected from the group consisting of alkyl having 1 to 8 carbon atoms, alkenyl having 2 to 8 carbon atoms, phenyl, alkoxy having 1 to 8 carbon atoms, and the hydroxyl group, and R is a group selected from the group consisting of alkyl having 1 to 8 carbon atoms, alkenyl having 2 to 8 carbon atoms, and phenyl, wherein at least 0.10 to 3.0 wt % of the $R^a$ and R in the molecule are alkenyl group having 2 to 8 carbon atoms and at least 50% of the total number of $R^a$ and R in the molecule is alkyl group having 1 to 8 carbon atoms.

Component (A) comprises at least one organopolysiloxane fluid having a branched structure and represented by the average siloxane unit formula (2):

$$(R^aR_2SiO_{1/2})_4(R_2SiO_{2/2})_m(SiO_{4/2}) \quad (2)$$

wherein $R^a$ is a group selected from the group consisting of alkyl having 1 to 8 carbon atoms, alkenyl having 2 to 8 carbon atoms, phenyl, alkoxy having 1 to 8 carbon atoms, and the hydroxyl group; R is a group selected from the group consisting of alkyl having 1 to 8 carbon atoms, alkenyl having 2 to 8 carbon atoms, and phenyl; at least 3 wt % of the $R^a$ and R in the molecule are alkenyl having 2 to 8 carbon atoms; at least 50% of the total number of $R^a$ and R in the molecule is alkyl having 1 to 8 carbon atoms; and m=15 to 995.

Component (A) is an organopolysiloxane having a branched structure and represented by the average siloxane unit formula (3):

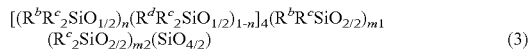

(3)

wherein $R^b$ is alkenyl group having 2 to 8 carbon atoms; $R^c$ is alkyl group having 1 to 8 carbon atoms or phenyl; $R^d$ is a group selected from the group consisting of alkyl having 1 to 8 carbon atoms, alkoxy having 1 to 8 carbon atoms, and the hydroxyl group; there are at least three $R^b$ in the molecule; at least 50% of the total number of $R^b$, $R^c$, and $R^d$ in the molecule is alkyl having 1 to 8 carbon atoms; n is 0 or 1; m1 is a number with a value of at least 1; m2 is a number with a value of at least 0; and m1+m2=15 to 995.

In preferable component (A), $R^b$ is vinyl or hexyenyl group, m1 ranges 0 to 20 and total number of siloxane units (=m1+m2+4) ranges from 50 to 400. The preferred viscosity of component (A) ranges from 50 to 1,000 mPa·s. The vinyl content is within the range of 0.10 to 3.0 wt %.

Typical examples of this alkyl having 1 to 8 carbon atoms are methyl, ethyl, propyl, and so forth, with methyl being preferable. Typical examples of the alkenyl having 2 to 8 carbon atoms are vinyl, allyl, hexenyl, and so forth, with vinyl being preferable. The alkoxy having 1 to 8 carbon atoms can be methoxy, ethoxy, and so forth.

The $R^aR_2SiO_{1/2}$ unit can be exemplified by the Vi(Me$_2$)SiO$_{1/2}$ unit, He(Me)$_2$SiO$_{1/2}$ unit, (Me)$_3$SiO$_{1/2}$ unit, ViMePhSiO$_{1/2}$ unit, and (HO)(Me)$_2$SiO$_{1/2}$ unit (wherein Vi denotes the vinyl group, He denotes the hexenyl group, Me denotes the methyl group, and Ph denotes the phenyl group; this also applies hereinafter). The combination of these units (for example, Vi(Me$_2$)SiO$_{1/2}$ unit and (Me)$_3$SiO$_{1/2}$ unit) is possible in the same molecule.

The $R_2SiO_{2/2}$ unit can be exemplified by the (Me)$_2$SiO$_{2/2}$ unit, ViMeSiO$_{2/2}$ unit, and MePhSiO$_{2/2}$ unit. The combination of these units (for example, (Me)$_2$SiO$_{2/2}$ unit and ViMeSiO$_{2/2}$ unit) is possible in the same molecule.

In order to realize an excellent anchorage to the substrate, the $R^aR_2SiO_{1/2}$ unit preferably contains alkenyl having 2 to 8 carbon atoms, such as the Vi(Me)$_2$SiO$_{1/2}$ unit, He(Me)$_2$SiO$_{1/2}$ unit, and ViMePhSiO$_{1/2}$ unit.

The silicon-bonded alkenyl groups in component (A) undergo crosslinking by a hydrosilylation reaction with the silicon-bonded hydrogen atoms in component (C). At least 2 alkenyl groups must therefore be present in each molecule; at least 3 alkenyl groups must be present in each molecule in order to develop excellent adherence to the sheet-form substrate.

Component (A) is the base component of the silicone release coating composition according to the present invention. Preferably, component (A) may have a low degree of polymerization. The component (B) preferably has a straight chain structure and has a high viscosity and hence a high degree of polymerization. The component (B) possesses pendant vinyl functional group, which can form covalent bond with cured system by hydrosilylation. And the trimethylsiloxy terminal is not cured with the system, which can help lead partial of molecular chain migrate to the surface of cured release coating. This property can provide the cured release coating with a slippery touch feeling and low release force. Siloxane having a moderate viscosity (5,000 to 150,000 mPa·s at 25° C.) can provide the final release coating bath with feasible viscosity for multiple rolls coater, and also can have an appropriate reactivity when vulcanization. Due to this, the incorporation of just small amounts of component (B) can provide the cured coating with better slipperiness.

In this invention, component (A) is not limited as Q-branched polymer, but includes "linear organopolysiloxane, Q-branched organopolysiloxanes, mixtures of different linear organopolysiloxanes, and mixtures of linear- and Q-branched organopolysiloxanes". Most preferred component (A) is Q-branched one and mixture thereof.

Component (B), a diorganopolysiloxane represented by the average structural formula (1), having a viscosity at 25° C. of 5,000 to 150,000 mPa·s and alkenyl content of 0.05 to 0.80 wt %, preferably 0.05 to 0.50 wt %:

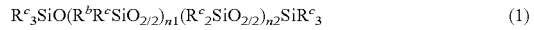

(1)

(wherein $R^b$ is alkenyl having 2 to 8 carbon atoms; $R^c$ is alkyl group having 1 to 8 carbon atoms or phenyl; each $R^b$ may be the same or different, and each $R^c$ may be the same or different in the same molecule, n1 is a number that provides alkenyl content of 0.05 to 0.80 wt %; n2 is a number with a value of at least 1; and n1+n2 is a number that provides this component with a viscosity at 25° C. of 5,000 to 150,000 mPa·s), functions to improve the releaseability of the cured coating with respect to tacky substances and also functions to provide the cured coating with slipperiness. Component (B) gradually ascends onto the coating formed when curing occurs through the hydrosilylation reaction between components (A) and (C) and thereby imparts an excellent slipperiness to the surface of the cured coating. The component (B) possesses pendant vinyl functional group (alkenyl group), which can form covalent bond with cured system by hydrosilylation. And the trialkylsiloxy terminal is not cured with the system, which can help lead partial of molecular chain migrate to the surface of cured release coating. This property can provide the cured release coating with a slippery touch feeling and low release force. Siloxane having a moderate viscosity (5,000 to 150,000 mPa·s at 25° C.) can provide applicable viscosity of the final release coating bath for multiple rolls coater processing, and also can have an appropriate reactivity when vulcanization. In addition, the concept of current invention is different from said "breed-out" effect, because the pendant alkenyl group in the siloxane can act as "anchor" point to bond component (B) into cured system. And siloxane having a viscosity of 5,000 to 150,000 mPa·s at 25° C. has entanglement effect with cured system, which would also reduce silicone migration.

Here, typical examples of the alkyl having 1 to 8 carbon atoms are methyl, ethyl, propyl, and so forth, with methyl being preferable. Typical examples of the alkenyl having 2 to 8 carbon atoms are vinyl, allyl, and hexenyl, with vinyl being preferable.

The $R^bR^cSiO_{2/2}$ unit can be exemplified by the ViMeSiO$_{2/2}$ unit.

The $R^c_2SiO_{2/2}$ unit can be exemplified by the (Me)$_2$SiO$_{2/2}$ unit and MePhSiO$_{2/2}$ unit.

The combination of these units is possible in the same molecule.

Component (B) includes a component that has silicon-bonded alkenyl groups in the molecule and thus is capable of undergoing a hydrosilylation reaction with component (C). Viewed from the perspective of the residual adhesiveness associated with the cured coating, there is a preference for component (B) having alkenyl groups in the molecule and thus being capable of undergoing a hydrosilylation reaction with component (C)

With regard to a component (B) that has silicon-bonded alkenyl groups in the molecule and thus that is capable of undergoing a hydrosilylation reaction with component (C), an excessively high alkenyl content results in impaired release properties and a reduced slipperiness for the cured coating. If component (B) with too low alkenyl content will cause no-bonding and more migration, and this content is therefore 0.05 to 0.80 wt % of the silicon-bonded organic groups in the molecule. The silicon-bonded alkenyl is present in side-chain position.

Component (B) has a viscosity at 25° C. of 5,000 to 150,000 mPa·s, while viewed from the standpoint of the residual adhesiveness its viscosity is preferably 20,000 to 130,000 mPa·s.

Component (B) is incorporated at 0.5 to 40 weight parts, in each case per 100 weight parts of the aforementioned component (A). The surface of the cured coating has an inadequate slipperiness when component (B) is incorporated at less than the aforementioned lower limit. When the aforementioned upper limit is exceeded, the organopolysiloxane composition assumes an excessively high viscosity, causing disturbances in the coating of a thin film on the sheet-form substrate.

Preferable component (B) has 0.06 to 0.19% of vinyl and/or hexyenyl groups, and viscosity of 20,000 to 130,000 mPa·s.

Component (C), an organohydrogenpolysiloxane that has a viscosity at 25° C. of 1 to 1,000 mPa·s and that has at least 2 silicon-bonded hydrogen atoms in each molecule and that has alkyl having 1 to 8 carbon atoms or phenyl for its silicon-bonded organic groups, functions as a crosslinking agent for component (A). Crosslinking occurs through a hydrosilylation reaction between the silicon-bonded hydrogen atoms in this component and the silicon-bonded alkenyl groups in component (A). As for component (B) which contains silicon-bonded alkenyl, the silicon-bonded alkenyl groups in component (B) also participate in the hydrosilylation reaction. As a consequence, at least 2 silicon-bonded hydrogen atoms must be present in each molecule and preferably at least 3 silicon-bonded hydrogen atoms are present in each molecule.

The bonding position of the silicon-bonded hydrogen atoms is not particularly limited, and, for example, they may be bonded in molecular chain terminal position, side-chain position, or at both positions.

The silicon-bonded hydrogen atom content is preferably 0.1 to 20 weight % and more preferably is 0.5 to 18 weight %.

The silicon-bonded organic groups encompass phenyl and alkyl having 1 to 8 carbon atoms, such as methyl, ethyl, propyl, butyl, octyl, and so forth, and preferably at least 50% of the total number of these organic groups is alkyl having 1 to 8 carbon atoms. The methyl group is preferred among these alkyl groups from the standpoint of the properties of the cured coating and the ease of production. The molecular structure of component (C) is exemplified by straight chain, branched chain, branched, and cyclic.

Component (C) has a viscosity at 25° C. of 1 to 1,000 mPa·s and preferably 5 to 500 mPa·s. The basis for this is as follows: when the viscosity at 25° C. is less than 1 mPa·s, component (C) readily volatilizes out of the organopolysiloxane composition; the organopolysiloxane composition takes on long cure times at above 1,000 mPa·s.

This component (C) can be exemplified by trimethylsiloxy-endblocked methylhydrogenpolysiloxanes, trimethylsiloxy-endblocked dimethylsiloxane•methylhydrogensiloxane copolymers, dimethylhydrogensiloxy-endblocked dimethylsiloxane•methylhydrogensiloxane copolymers, cyclic methylhydrogenpolysiloxanes, cyclic methylhydrogensiloxane•dimethylsiloxane copolymers, tris (dimethylhydrogensiloxy)methylsilane, and tetra(dimethylhydrogensiloxy)silane.

Plural components (C) which are different each other may also be used together for preparing the same composition.

Component (C) is incorporated in an amount sufficient to provide a value of 0.8:1 to 5:1 for the molar ratio of silicon-bonded hydrogen atoms in component (C) to alkenyl groups in components (A) and (B) and preferably in an amount sufficient to provide a value of 0.9:1 to 3:1 for this molar ratio, i.e. incorporated at 1.5 to 10 weight parts, in each case per 100 weight parts of the aforementioned component (A)

The curability is reduced when this molar ratio is less than the lower limited cited above, while a large peel resistance value occurs when the cited upper limit is exceeded and practical releasability is not obtained.

Component (D) is a catalyst that promotes the hydrosilylation reaction between the silicon-bonded hydrogen atoms in component (C) and the silicon-bonded alkenyl groups in component (A) and functions to bring about crosslinking by an addition reaction between components (A) and (C). When component (B) contains one or more silicon-bonded alkenyl groups in each molecule, this catalyst also promotes the hydrosilylation reaction with the silicon-bonded alkenyl groups in component (B).

There are no particular limitations on this component (D) other than that it is a catalyst used for the hydrosilylation reaction, and component (D) can be specifically exemplified by platinum-type catalysts such as chloroplatinic acid, alcohol-modified chloroplatinic acid, chloroplatinic acid/olefin complexes, chloroplatinic acid/ketone complexes, platinum/alkenylsiloxane complexes, platinum tetrachloride, platinum micropowder, solid platinum supported on a support such as alumina powder or silica powder, platinum black, olefin complexes of platinum, carbonyl complexes of platinum, and the powdery thermoplastic resin (e.g., methyl methacrylate resin, polycarbonate resin, polystyrene resin, silicone resin, and so forth) that incorporates a platinum-type catalyst as previously listed.

Other examples are rhodium catalysts such as [Rh (O$_2$CCH$_3$)$_2$]$_2$, Rh(O$_2$CCH$_3$)$_3$, Rh$_2$(C$_8$H$_{15}$O$_2$)$_4$, Rh(C$_5$H$_7$O$_2$)$_3$, Rh(C$_5$H$_7$O$_2$)(CO)$_2$, Rh(CO)[Ph$_3$P](C$_5$H$_7$O$_2$), RhX$_3$[(R$_6$)$_2$S]$_3$, (R$_{73}$P)$_2$Rh(CO)$_x$, (R$_{73}$P)$_2$Rh(CO)H, Rh$_2$X$_2$Y$_4$, H$_a$Rh$_b$(E)$_c$Cl$_d$, and Rh[O(CO)R$_3$]$_{3-n}$(OH)$_n$ (in the formulas, X is the hydrogen atom, chlorine atom, bromine atom, or iodine atom; Y is alkyl, CO, or C$_8$H$_{14}$; R$_6$ is alkyl, cycloalkyl, or aryl; R$_7$ is alkyl, aryl, alkyloxy, or aryloxy; E is an olefin; a is 0 or 1; b is 1 or 2; c is an integer from 1 to 4; d is 2, 3, or 4; and n is 0 or 1) and iridium catalysts such as Ir(OOCCH$_3$)$_3$, Ir(C$_5$H$_7$O$_2$)$_3$, [Ir(Z)(E)$_2$]$_2$, and [Ir(Z)(Dien)]$_2$ (in the formulas, Z is the chlorine atom, bromine atom, iodine atom, or an alkoxy group; E is an olefin; and Dien is cyclooctadiene).

Viewed from the perspective of the ability to accelerate the reaction, chloroplatinic acid, platinum/vinylsiloxane complexes, and olefin complexes of platinum are preferred, and the chloroplatinic acid/divinyltetramethyldisiloxane complex, chloroplatinic acid/tetramethyltetravinylcyclotetrasiloxane complex, and platinum/alkenylsiloxane complexes, e.g., the platinum.divinyltetramethyldisiloxane complex, platinum/tetramethyltetravinylcyclotetrasiloxane complex, and so forth, are particularly preferred.

Component (D) is incorporated in a catalytic amount, and in general is incorporated at 10 to 600 ppm and preferably is incorporated at 5 to 500 ppm, in each case as the amount of metal in component (D) with reference to the total weight of the silicone release coating composition of the present invention.

Component (E), surfactant, is an ingredient of emulsifying said components (A)-(B) into water (F), which is not particularly limited, as long as it can emulsify said components (A)-(B) into water (F), preferably comprising at least one nonionic surfactant selected from the group consisting of polyether compounds, polyether-modified silicones, water-soluble polyester compounds, water-soluble polyvinyl alcohols and water-soluble polyvinylacetates.

Preferred examples of surfactants include the following:
PVA: polyvinyl alcohol;
Nonionic surfactant 1: iso-C13 oxo alcohol ethoxylates EO(12) [Lutensol TO12];
Nonionic surfactant 2: Polyoxyethylene(23) Lauryl Ether [Brij35];
Nonionic surfactant 3: Polyoxyethylene(4) Lauryl Ether [Brij30].

In the nonionic surfactant of the present invention, which is used as ingredient, HLB should be 10-15, the pH should be 6.5 or less, and the ionic conductance should be 30 μS/cm or less. This ingredient is used to emulsify a mixture consisting of the silicone compound.

Examples of a nonionic surfactant used by the present invention are an alkyl ether, such as polyoxyethylene lauryl ether and polyoxyethylene tridecyl ether; an alkyl ester, such as polyoxyethylene oleate and polyoxyethylene laurate; and an alkyl aryl ether, such as polyoxyethylene nonylphenyl ether and polyoxyethylene octylphenyl ether, but from the viewpoint of emulsification and safety, a polyoxyethylene alkyl ether is preferred.

In the present invention, if a surfactant other than one for which the HLB is 10-15, the pH is 6.5 or less, and the ionic conductance is 30 μS/cm or less is used, the prepared emulsion composition deteriorates with time. A cationic and an anionic surfactant can also be used together in amounts which do not impair the effect of the emulsion composition of the present invention. By suitably using a cationic and an anionic surfactant, it is possible to obtain an improvement in the wettability or leveling properties of the emulsion.

The polyvinyl alcohol (hereafter, PVA) in the present invention is preferred to have a saponification degree of 86-98 mol %, and the viscosity of a 4% aqueous solution at 20° C. should be 4-100 mPa·s. This PVA is a preferred ingredient as an assistant co-surfactant to promote emulsification with the surfactant, and stabilizes the formed emulsion. That is to say, the combination of PVA with other surfactants further improves the temporal stability of the obtained emulsion. If the saponification degree is less than 85 mol % or more than 99 mol %, the emulsion stabilizing effect is inadequate. Also, if the viscosity of a 4% aqueous solution at 20° C. is less than 3 mPa·s, the emulsion stabilizing effect is poor, while if it exceeds 100mPa·s, the coating properties of the emulsion deteriorate. The polymerization degree of PVA whereof the viscosity of a 4% aqueous solution at 20° C. is 4-100 mPa·s, is equivalent to about 500 to 4,000. Preferably, the surfactant is a water-soluble polyvinylalchol (PVA) for improving the wetting performance and rub-off resistance performance on the cured release coating.

Component (E) is incorporated at 0.5 to 30 weight parts, in each case per 100 weight parts of the aforementioned component (A). The component (E) comprises at least one nonionic surfactant selected from the group consisting of polyether compounds, polyether-modified silicones, water-soluble polyester compounds, water-soluble polyvinyl alcohols and water-soluble polyvinylacetates.

Component (F), water, is main component of aqueous phase of our inventive emulsion, and exemplified as tap water, purified water, mineral water and the like. In addition, in the aqueous emulsion of the present invention, optional components which are water-soluble or water-dispersible may be previously blended in the water phase unless such component impairs the effect of this invention.

Component (F) is incorporated at 60 to 2000 weight parts, in each case per 100 weight parts of the aforementioned component (A).

In addition to the components described in the preceding, the silicone release coating composition of the present invention also contains a hydrosilylation reaction inhibitor (G) in order to render it thermosetting while improving the storage stability by inhibiting gelation and curing at ambient temperature. This hydrosilylation reaction inhibitor can be exemplified by acetylenic compounds, ene-yne compounds, organonitrogen compounds, organophosphorus compounds, and oxime compounds and can be specifically exemplified by alkynyl alcohols such as 3-methyl-1-butyn-3-ol, 3,5-dimethyl-1-hexyn-3-ol, 3-methyl-1-pentyn-3-ol, phenylbutynol, and so forth; and by 3-methyl-3-penten-1-yne, 3,5-dimethyl-1-hexyn-3-ene, benzotriazole, 1-ethynyl-1-cyclohexanol, and methylvinylcyclosiloxanes. The amount of incorporation of this hydrosilylation reaction inhibitor is generally in the range of 0.05 to 2 weight parts and preferably in the range of 0.01 to 2 weight parts, in each case per 100 weight parts of component (A), and may be selected as appropriate in view of the type of hydrosilylation reaction inhibitor, the properties and amount of incorporation of the hydrosilylation reaction catalyst, the amount of alkenyl groups in component (A), and the amount of silicon-bonded hydrogen atoms in component (C).

Emulsion Preparation:

The inventive emulsion can be prepared by emulsifying said components (A)-(D) including optional silicones with surfactants and/or co-surfactants into water. Preferably, adding water and emulsification process is stepwise manner including multiple emulsification and dispersion procedure. Most preferred emulsification process includes:

(1) Blend base polymer, vinyl functional additive, crosslinker, suitable amount of anchorage promoter together with inhibitor;
(2) Add surfactants water solution, co-surfactants into the blend oil and mix;
(3) Weight suitable amount of buffer solution to above mixture and mix with moderate speed and mix for about 30 minutes;
(4) Use homoginizer to mix with highest speed for several miniutes;
(5) Take the pre-emulsion to sonolater for cycling several times under suitable pressure.

Release Coating Bath Preparation (1) Add water to above base emulsion coating in a beaker and mix until homogeneous;
(2) Add suitable catalyst emulsion into above diluted emulsion and mix for 10 minutes; and (3) Coat the bath on PET (polyethylene glycol terephthalate) substrate by a coater and then thermal addition cured in oven.

An emulsifying device is preferably used in order to bring about uniform emulsion particles (droplets) in the water. This emulsifying device can be exemplified by homomixers, paddle mixers, Henschel mixers, homodispersers, colloid mills, propeller stirrers, homogenizers, continuous inline emulsifying devices, ultrasonic emulsifying devices, and vacuum kneaders.

The particle size for the droplet is not limited, but preferably, the particle size for the droplet is less than 1 um. Small particle size of the emulsion facilitates molecular transfer of the composition on the treated substrate.

A cured low release force emulsion silicone release coating that exhibits better slipperiness and a suitable peel resistance value with respect to tacky substances can be formed on the surface of a sheet-form substrate, by uniformly coating the silicone release coating composition of the present invention as described above on the surface of any of various sheet-form substrates, e.g., glassine paper, cardboard, clay-coated paper, polyolefin-laminated paper and particularly polyethylene-laminated paper, thermoplastic resin film (e.g., polyester film, polyethylene film, polypropylene film, polyamide film), natural fiber fabrics, synthetic fiber fabrics, metal foils (e.g., aluminum foil), and so forth, and heating under conditions suitable for causing components (A) and (C), or components (A), (B) and (C) to undergo crosslinking through the hydrosilylation reaction.

Generally 100 to 200° C. is appropriate for the curing temperature of the silicone release coating composition of the present invention on the sheet-form substrate, but curing temperatures above 200° C. can be used when the substrate possesses a good heat resistance. The method of heating is not particularly limited and can be exemplified by heating in a hot air circulation oven, passage through a long oven, or radiant heating using an infrared lamp or a halogen lamp. Curing can also be effected by using heating in combination with exposure to ultraviolet radiation. When component (D) is a platinum/alkenylsiloxane complex catalyst, even when this catalyst is incorporated at 50 to 200 ppm as the amount of platinum metal with reference to the total quantity of the composition, a cured coating that exhibits an excellent adherence to sheet-form substrates and excellent release properties with respect to tacky substances can be readily obtained in a brief period of time, i.e., 40 to 1 second, at 100 to 150° C.

The silicone release coating composition of the present invention is especially preferably applied on at least one side of sheet-form substrate with multiple rolls coater. With regard to the tacky substance that can be applied to the release sheet or film yielded by the application and curing of the silicone release coating composition of the present invention onto the surface of a sheet-form substrate, this tacky substance can be, for example, any of various pressure-sensitive adhesives and various adhesives, and examples thereof are acrylic resin-type pressure-sensitive adhesives, rubber-type pressure-sensitive adhesives, and silicone-type pressure-sensitive adhesives, as well as acrylic resin-type adhesives, synthetic rubber-type adhesives, silicone-type adhesives, epoxy resin-type adhesives, and polyurethane-type adhesives. Other examples are asphalt, sticky foods such as mochi (i.e. rice cake), glues and pastes, and bird lime. Preferred application of present invention is multiple rolls coater with in situ two side coating process.

The composition of the present invention is useful for the formation of cured coatings that exhibit better surface slipperiness and an excellent low release performance versus tacky substances, and in particular is well suited as a cured release coating-forming agent for process paper, asphalt packaging paper, and various plastic films. In addition, sheet-form substrates bearing a release coating formed by the cure of the composition of the present invention are well-suited for use in particular for process paper, wrapping or packaging paper for tacky substances and sticky substances, pressure-sensitive adhesive tape, pressure-sensitive labels, and so forth.

EXAMPLES

Examples and comparative examples are given below in order to specifically describe the present invention; however, the present invention is not limited to the examples that follow. In the examples and comparative examples that follow, parts are weight parts in all instances and ppm denotes weight-ppm in all instances. Here, PDMS means polydimethylsiloxane. Silicones 1 to 9 shown in below Table 1 are available in market from Dow-Corning Corporation.

TABLE 1

Raw material selection for base polymer, shown in the following table:

| Nomenclature | Chemical description |
|---|---|
| Siloxane 1 (Dow-Corning) | Siloxane composed of Q, D, M, $M^{vi}$ unit, viscosity is about 450 mPa · s, vi % = 0.47% |
| Siloxane 2 (Dow-Corning) | High molecular weight PDMS gum with terminal vinyl only, vi % = 0.012% |
| Siloxane 3 (Dow-Corning) | PDMS with vinyl at pendant position, 36,000 mPa · s, vi % = 0.12%. Trimethylsiloxy capped |
| Siloxane 4 (Dow-Corning) | PDMS with terminal vinyl only, 9,000 mPa · s, vi % = 0.104% |
| Siloxane 5 (Dow-Corning) | PDMS with vinyl at pendant position, 14,500 mPa · s, vi % = 0.15%. Trimethylsiloxycapped |
| Siloxane 6 (Dow-Corning) | PDMS with vinyl at pendant position, 111,000 mPa · s, vi % = 0.085%. Trimethylsiloxy capped |
| Siloxane 7 (Dow-Corning) | PDMS with vinyl at pendant position, 51,000 mPa · s, vi % = 0.34%. Trimethylsiloxy capped |
| Siloxane 8 (Dow-Corning) | Dimethyl, methylhydrogen siloxane, Trimethylsiloxy capped |
| Siloxane 9 (Dow-Corning) | alkoxy containing alkenyl/epoxy functional organopolysiloxane anchorage promoter |
| MB | Methyl butynol |

Note:
Q: $SiO_{4/2}$, D: $Me_2SiO_{2/2}$, M: $Me_3SiO_{1/2}$, vi: vinyl, $M^{vi}$: $ViMe_2SiO_{1/2}$.

Evaluation Processes:
(1) Coat weight (CW): use X-Ray to detect the coat weight of silicone by Oxford lab-x 3500 instrument manufactured by Oxford Instruments PLC, Oxon, United Kingdom. Use uncoated PET as blank. Refer to FINAT Test Method No. 7 (FINAT Technical Handbook 7th edition, 2005).
(2) Rub off (RO): test the coat weight of the coated release coating using Oxford lab-x 3500 instrument. Then use Abrasion Tester (Elcometer 1720) to rub the sample 30 cycles at a speed of 30 cycles/minute. Finally, test the coat weight again to measure the relative anchorage performance. The Anchorage rate is recorded as (CW after)/(CW before)×100%.
(3) Delayed RO test: place release coating samples into 70° C. 80% humidity controlled oven for 3 days, then remove from oven and test the RO.
(4) Release force (RF): the 180 degree peeling test is used to measure release force from liner with Tesa 7475 standard tape which was laminated on coated release coating, loaded weight of 20 g/cm² on laminated sample and left under RT (room temperature) or 70° C. for 20 hours. After 20 hours, remove the load and wait for 30 minutes. Then test the release force by ChemInstruments AR-1500. Refer to FINAT Test Method No. 10 (FINAT Technical Handbook 7th edition, 2005).

(5) SAS (Subsequent Adhesive Strength, indicator of migration): test tape is laminated by Nitto Denko 31B tape on coated release coating, load weight of 20 g/cm$^2$ and left under 70° C. for 20 h. After 20 h, remove the load and wait for 30 minutes at room temperature. Then transfer the 31B tape on PET substrate and wait for another 1 h. Test the release force by ChemInstruments AR-1500. In SAS test, laminate 31B tape on PTFE substrate and treat the PTFE sample the same way as release coating sample. The SAS value is recorded as $RF_{release}/RF_{PTFE} \times 100\%$. Refer to FINAT Test Method No. 11 (FINAT Technical Handbook 7th edition, 2005).

(6) Coefficient of kinetic friction (CoF): CoF is tested on MXD-02 Coefficient of Friction Tester manufacture by Labthink according to test standard GB 10006. The bottom side of load cell is covered by fiber felt. Fix cured release coating and let release coated surface in contact with bottom of load cell. This was followed by pulling with conditions of load=200 g and pulling speed=100 mm/min and the force (g) required for pulling was measured. The force (g) required for pulling/200 g was designated as the CoF of the cured coating.

Composition Formulation of Examples

The performance behavior of release composition of branched siloxane 1 and mixtures of branched siloxane 1 with siloxanes 2-4 having vinyl functional additive was systematically compared in current invention, shown in the following Table 2:

TABLE 2

| Ex. | Siloxane 1 | Siloxane 2 | Siloxane 3 | Siloxane 4 | Siloxane 8 | Siloxane 9 | MB | Pt catalyst |
|---|---|---|---|---|---|---|---|---|
| 1 | 100 | | | | 4.28 | 1 | 0.125 | 125 ppm |
| 2 | 98 | 2 | | | 4.28 | 1 | 0.125 | 125 ppm |
| 3 | 96 | | 4 | | 4.28 | 1 | 0.125 | 125 ppm |
| 4 | 95 | | | 5 | 4.28 | 1 | 0.125 | 125 ppm |

The performance behavior of release composition of branched siloxane 1 and mixtures of branched siloxane 1 with siloxanes 3 and 5-7 having different MW (molecular weight) vinyl pendant functional additive was compared in current invention, shown in the following Table 3:

TABLE 3

| Ex. | Siloxane 1 | Siloxane 3 | Siloxane 5 | Siloxane 6 | Siloxane 7 | Siloxane 8 | Siloxane 9 | MB | Pt catalyst |
|---|---|---|---|---|---|---|---|---|---|
| 5 | 100 | | | | | 4.28 | 1 | 0.125 | 125 ppm |
| 6 | 96 | 4 | | | | 4.28 | 1 | 0.125 | 125 ppm |
| 7 | 96 | | 4 | | | 4.28 | 1 | 0.125 | 125 ppm |
| 8 | 96 | | | 4 | | 4.28 | 1 | 0.125 | 125 ppm |
| 9 | 96 | | | | 4 | 4.28 | 1 | 0.125 | 125 ppm |

The performance behavior of release composition of branched siloxane 1 and mixtures of branched siloxane 1 with different level of silicone 3 was systematically compared in current invention, shown in the following Table 4:

TABLE 4

| Ex. | Siloxane 1 | Siloxane 3 | Siloxane 8 | Siloxane 9 | MB | Pt catalyst |
|---|---|---|---|---|---|---|
| 10 | 100 | | 4.28 | 1 | 0.125 | 125 ppm |
| 11 | 96 | 4 | 4.28 | 1 | 0.125 | 125 ppm |
| 12 | 94 | 6 | 4.25 | 1 | 0.125 | 125 ppm |
| 13 | 90 | 10 | 4.14 | 1 | 0.125 | 125 ppm |
| 14 | 85 | 15 | 4.03 | 1 | 0.125 | 125 ppm |
| 15 | 80 | 20 | 3.90 | 1 | 0.125 | 125 ppm |

Example 1 (Comparative)

Procedure:

Emulsion Preparation:

(i) Blending 100 parts of Siloxane 1, 4.28 parts of Siloxane 8, 1 part of Siloxane 9, and 0.125 parts of MB;

(ii) Adding 35 parts 10% PVA water solution and 0.45 parts of Lutensol TO12 from BASF into the blend oil, and mixing;

(iii) Weighting 110 parts of citric acid-sodium hydroxide buffer solution with pH value at 5 to above mixture and mixing with 500 rpm speed and mixing for about 30 minutes;

(iv) Using homoginizer to mix with 6000 rpm speed for 2 minutes; and (v) Taking the pre-emulsion to sonolater for cycling 6 times under 100 bar pressure.

Release Coating Bath Preparation:

(i) Adding 75 parts of water to 21.25 parts of above base emulsion coating in a beaker and mixing until homogeneous;

(ii) Adding 3.75 parts of Dow Corning Syl-off EM 7975 catalyst emulsion into above diluted emulsion and mixing for 10 minutes; and (iii) Coating the bath on PET substrate by a coater and then thermal addition cured in oven.

Example 2 (Practical)

Procedure:
Emulsion Preparation:
(i) Blending 98 parts of Siloxane 1, 2 parts of Siloxane 2, 4.28 parts of Siloxane 8, 1 part of Siloxane 9, and 0.125 parts of MB;
(ii) Adding 35 parts 10% PVA water solution and 0.45 parts of Lutensol TO12 from BASF into the blend oil, and mixing;
(iii) Weighting 110 parts of citric acid-sodium hydroxide buffer solution with pH value at 5 to above mixture and mixing with 500 rpm speed and mixing for about 30 minutes;
(iv) Using homoginizer to mix with 6000 rpm speed for 2 minutes; and
(v) Taking the pre-emulsion to sonolater for cycling 6 times under 100 bar pressure.
Release Coating Bath Preparation:
(i) Adding 75 parts of water to 21.25 parts of above base emulsion coating in a beaker and mixing until homogeneous;
(ii) Adding 3.75 parts of Dow Corning Syl-off EM 7975 catalyst emulsion into above diluted emulsion and mixing for 10 minutes; and
(iii) Coating the bath on PET substrate by a coater and then thermal addition cured in oven.

Example 3 (Practical)

Procedure:
Emulsion Preparation:
(i) Blending 96 parts of Siloxane 1, 4 parts of Siloxane 3, 4.28 parts of Siloxane 8, 1 part of Siloxane 9, and 0.125 parts of MB;
(ii) Adding 35 parts 10% PVA water solution and 0.45 parts of Lutensol TO12 from BASF into the blend oil, and mixing;
(iii) Weighting 110 parts of citric acid-sodium hydroxide buffer solution with pH value at 5 to above mixture and mixing with 500 rpm speed and mixing for about 30 minutes;
(iv) Using homoginizer to mix with 6000 rpm speed for 2 minutes; and
(v) Taking the pre-emulsion to sonolater for cycling 6 times under 100 bar pressure.
Release Coating Bath Preparation:
(i) Adding 75 parts of water to 21.25 parts of above base emulsion coating in a beaker and mixing until homogeneous;
(ii) Adding 3.75 parts of Dow Corning Syl-off EM 7975 catalyst emulsion into above diluted emulsion and mixing for 10 minutes; and
(iii) Coating the bath on PET substrate by a coater and then thermal addition cured in oven.

Example 4 (Practical)

Procedure:
Emulsion Preparation:
(i) Blending 98 parts of Siloxane 1, 5 parts of Siloxane 4, 4.28 parts of Siloxane 8, 1 part of Siloxane 9, and 0.125 parts of MB;
(ii) Adding 35 parts 10% PVA water solution and 0.45 parts of Lutensol TO12 from BASF into the blend oil, and mixing;
(iii) Weighting 110 parts of citric acid-sodium hydroxide buffer solution with pH value at 5 to above mixture and mixing with 500 rpm speed and mixing for about 30 minutes;
(iv) Using homoginizer to mix with 6000 rpm speed for 2 minutes; and
(v) Taking the pre-emulsion to sonolater for cycling 6 times under 100 bar pressure.
Release Coating Bath Preparation:
(i) Adding 75 parts of water to 21.25 parts of above base emulsion coating in a beaker and mixing until homogeneous;
(ii) Adding 3.75 parts of Dow Corning Syl-off EM 7975 catalyst emulsion into above diluted emulsion and mixing for 10 minutes; and
(iii) Coating the bath on PET substrate by a coater and then thermal addition cured in oven.

Example 5 (Comparative)

Procedure:
Emulsion Preparation:
(i) Blending 100 parts of Siloxane 1, 4.28 parts of Siloxane 8, 1 part of Siloxane 9, and 0.125 parts of MB;
(ii) Adding 35 parts 10% PVA water solution and 0.45 parts of Lutensol TO12 from BASF into the blend oil, and mixing;
(iii) Weighting 110 parts of citric acid-sodium hydroxide buffer solution with pH value at 5 to above mixture and mixing with 500 rpm speed and mixing for about 30 minutes;
(iv) Using homoginizer to mix with 6000 rpm speed for 2 minutes; and
(v) Taking the pre-emulsion to sonolater for cycling 6 times under 100 bar pressure.
Release Coating Bath Preparation:
(i) Adding 75 parts of water to 21.25 parts of above base emulsion coating in a beaker and mixing until homogeneous;
(ii) Adding 3.75 parts of Dow Corning Syl-off EM 7975 catalyst emulsion into above diluted emulsion and mixing for 10 minutes; and
(iii) Coating the bath on PET substrate by a coater and then thermal addition cured in oven.

Example 6 (Practical)

Procedure:
Emulsion Preparation:
(i) Blending 96 parts of Siloxane 1, 4 parts of Siloxane 3, 4.28 parts of Siloxane 8, 1 part of Siloxane 9, and 0.125 parts of MB;
(ii) Adding 35 parts 10% PVA water solution and 0.45 parts of Lutensol TO12 from BASF into the blend oil, and mixing;
(iii) Weighting 110 parts of citric acid-sodium hydroxide buffer solution with pH value at 5 to above mixture and mixing with 500 rpm speed and mixing for about 30 minutes;
(iv) Using homoginizer to mix with 6000 rpm speed for 2 minutes; and
(v) Taking the pre-emulsion to sonolater for cycling 6 times under 100 bar pressure.
Release Coating Bath Preparation:
(i) Adding 75 parts of water to 21.25 parts of above base emulsion coating in a beaker and mixing until homogeneous;

(ii) Adding 3.75 parts of Dow Corning Syl-off EM 7975 catalyst emulsion into above diluted emulsion and mixing for 10 minutes; and
(iii) Coating the bath on PET substrate by a coater and then thermal addition cured in oven.

Example 7 (Practical)

Procedure:
Emulsion Preparation:
(i) Blending 96 parts of Siloxane 1, 4 parts of Siloxane 5, 4.28 parts of Siloxane 8, 1 part of Siloxane 9, and 0.125 parts of MB;
(ii) Adding 35 parts 10% PVA water solution and 0.45 parts of Lutensol TO12 from BASF into the blend oil, and mixing;
(iii) Weighting 110 parts of citric acid-sodium hydroxide buffer solution with pH value at 5 to above mixture and mixing with 500 rpm speed and mixing for about 30 minutes;
(iv) Using homoginizer to mix with 6000 rpm speed for 2 minutes; and
(v) Taking the pre-emulsion to sonolater for cycling 6 times under 100 bar pressure.
Release Coating Bath Preparation:
(i) Adding 75 parts of water to 21.25 parts of above base emulsion coating in a beaker and mixing until homogeneous;
(ii) Adding 3.75 parts of Dow Corning Syl-off EM 7975 catalyst emulsion into above diluted emulsion and mixing for 10 minutes; and
(iii) Coating the bath on PET substrate by a coater and then thermal addition cured in oven.

Example 8 (Practical)

Procedure:
Emulsion Preparation:
(i) Blending 96 parts of Siloxane 1, 4 parts of Siloxane 6, 4.28 parts of Siloxane 8, 1 part of Siloxane 9, and 0.125 parts of MB;
(ii) Adding 35 parts 10% PVA water solution and 0.45 parts of Lutensol TO12 from BASF into the blend oil, and mixing;
(iii) Weighting 110 parts of citric acid-sodium hydroxide buffer solution with pH value at 5 to above mixture and mixing with 500 rpm speed and mixing for about 30 minutes;
(iv) Using homoginizer to mix with 6000 rpm speed for 2 minutes; and
(v) Taking the pre-emulsion to sonolater for cycling 6 times under 100 bar pressure.
Release Coating Bath Preparation:
(i) Adding 75 parts of water to 21.25 parts of above base emulsion coating in a beaker and mixing until homogeneous;
(ii) Adding 3.75 parts of Dow Corning Syl-off EM 7975 catalyst emulsion into above diluted emulsion and mixing for 10 minutes; and
(iii) Coating the bath on PET substrate by a coater and then thermal addition cured in oven.

Example 9 (Practical)

Procedure:
Emulsion Preparation:
(i) Blending 96 parts of Siloxane 1, 4 parts of Siloxane 7, 4.28 parts of Siloxane 8, 1 part of Siloxane 9, and 0.125 parts of MB;
(ii) Adding 35 parts 10% PVA water solution and 0.45 parts of Lutensol TO12 from BASF into the blend oil, and mixing;
(iii) Weighting 110 parts of citric acid-sodium hydroxide buffer solution with pH value at 5 to above mixture and mixing with 500 rpm speed and mixing for about 30 minutes;
(iv) Using homoginizer to mix with 6000 rpm speed for 2 minutes; and
(v) Taking the pre-emulsion to sonolater for cycling 6 times under 100 bar pressure.
Release Coating Bath Preparation:
(i) Adding 75 parts of water to 21.25 parts of above base emulsion coating in a beaker and mixing until homogeneous;
(ii) Adding 3.75 parts of Dow Corning Syl-off EM 7975 catalyst emulsion into above diluted emulsion and mixing for 10 minutes; and
(iii) Coating the bath on PET substrate by a coater and then thermal addition cured in oven.

Example 10 (Comparative)

Procedure:
Emulsion Preparation:
(i) Blending 100 parts of Siloxane 1, 4.28 parts of Siloxane 8, 1 part of Siloxane 9, and 0.125 parts of MB;
(ii) Adding 35 parts 10% PVA water solution and 0.45 parts of Lutensol TO12 from BASF into the blend oil, and mixing;
(iii) Weighting 110 parts of citric acid-sodium hydroxide buffer solution with pH value at 5 to above mixture and mixing with 500 rpm speed and mixing for about 30 minutes;
(iv) Using homoginizer to mix with 6000 rpm speed for 2 minutes; and
(v) Taking the pre-emulsion to sonolater for cycling 6 times under 100 bar pressure.
Release Coating Bath Preparation:
(i) Adding 75 parts of water to 21.25 parts of above base emulsion coating in a beaker and mixing until homogeneous;
(ii) Adding 3.75 parts of Dow Corning Syl-off EM 7975 catalyst emulsion into above diluted emulsion and mixing for 10 minutes; and
(iii) Coating the bath on PET substrate by a coater and then thermal addition cured in oven.

Example 11 (Practical)

Procedure:
Emulsion Preparation:
(i) Blending 96 parts of Siloxane 1, 4 parts of Siloxane 3, 4.28 parts of Siloxane 8, 1 part of Siloxane 9, and 0.125 parts of MB;
(ii) Adding 35 parts 10% PVA water solution and 0.45 parts of Lutensol TO12 from BASF into the blend oil, and mixing;

(iii) Weighting 110 parts of citric acid-sodium hydroxide buffer solution with pH value at 5 to above mixture and mixing with 500 rpm speed and mixing for about 30 minutes;
(iv) Using homoginizer to mix with 6000 rpm speed for 2 minutes; and
(v) Taking the pre-emulsion to sonolater for cycling 6 times under 100 bar pressure.

Release Coating Bath Preparation:
(i) Adding 75 parts of water to 21.25 parts of above base emulsion coating in a beaker and mixing until homogeneous;
(ii) Adding 3.75 parts of Dow Corning Syl-off EM 7975 catalyst emulsion into above diluted emulsion and mixing for 10 minutes; and
(iii) Coating the bath on PET substrate by a coater and then thermal addition cured in oven.

Example 12 (Practical)

Procedure:
Emulsion Preparation:
(i) Blending 94 parts of Siloxane 1, 6 parts of Siloxane 3, 4.25 parts of Siloxane 8, 1 part of Siloxane 9, and 0.125 parts of MB;
(ii) Adding 35 parts 10% PVA water solution and 0.45 parts of Lutensol TO12 from BASF into the blend oil, and mixing;
(iii) Weighting 110 parts of citric acid-sodium hydroxide buffer solution with pH value at 5 to above mixture and mixing with 500 rpm speed and mixing for about 30 minutes;
(iv) Using homoginizer to mix with 6000 rpm speed for 2 minutes; and
(v) Taking the pre-emulsion to sonolater for cycling 6 times under 100 bar pressure.

Release Coating Bath Preparation:
(i) Adding 75 parts of water to 21.25 parts of above base emulsion coating in a beaker and mixing until homogeneous;
(ii) Adding 3.75 parts of Dow Corning Syl-off EM 7975 catalyst emulsion into above diluted emulsion and mixing for 10 minutes; and
(iii) Coating the bath on PET substrate by a coater and then thermal addition cured in oven.

Example 13 (Practical)

Procedure:
Emulsion Preparation:
(i) Blending 90 parts of Siloxane 1, 10 parts of Siloxane 3, 4.14 parts of Siloxane 8, 1 part of Siloxane 9, and 0.125 parts of MB;
(ii) Adding 35 parts 10% PVA water solution and 0.45 parts of Lutensol TO12 from BASF into the blend oil, and mixing;
(iii) Weighting 110 parts of citric acid-sodium hydroxide buffer solution with pH value at 5 to above mixture and mixing with 500 rpm speed and mixing for about 30 minutes;
(iv) Using homoginizer to mix with 6000 rpm speed for 2 minutes; and
(v) Taking the pre-emulsion to sonolater for cycling 6 times under 100 bar pressure.

Release Coating Bath Preparation:
(i) Adding 75 parts of water to 21.25 parts of above base emulsion coating in a beaker and mixing until homogeneous;
(ii) Adding 3.75 parts of Dow Corning Syl-off EM 7975 catalyst emulsion into above diluted emulsion and mixing for 10 minutes; and
(iii) Coating the bath on PET substrate by a coater and then thermal addition cured in oven.

Example 14 (Practical)

Procedure:
Emulsion Preparation:
(i) Blending 85 parts of Siloxane 1, 15 parts of Siloxane 3, 4.03 parts of Siloxane 8, 1 part of Siloxane 9, and 0.125 parts of MB;
(ii) Adding 35 parts 10% PVA water solution and 0.45 parts of Lutensol TO12 from BASF into the blend oil, and mixing;
(iii) Weighting 110 parts of citric acid-sodium hydroxide buffer solution with pH value at 5 to above mixture and mixing with 500 rpm speed and mixing for about 30 minutes;
(iv) Using homoginizer to mix with 6000 rpm speed for 2 minutes; and
(v) Taking the pre-emulsion to sonolater for cycling 6 times under 100 bar pressure.

Release Coating Bath Preparation:
(i) Adding 75 parts of water to 21.25 parts of above base emulsion coating in a beaker and mixing until homogeneous;
(ii) Adding 3.75 parts of Dow Corning Syl-off EM 7975 catalyst emulsion into above diluted emulsion and mixing for 10 minutes; and
(iii) Coating the bath on PET substrate by a coater and then thermal addition cured in oven.

Example 15 (Practical)

Procedure:
Emulsion Preparation:
(i) Blending 80 parts of Siloxane 1, 20 parts of Siloxane 3, 3.90 parts of Siloxane 8, 1 part of Siloxane 9, and 0.125 parts of MB;
(ii) Adding 35 parts 10% PVA water solution and 0.45 parts of Lutensol TO12 from BASF into the blend oil, and mixing;
(iii) Weighting 110 parts of citric acid-sodium hydroxide buffer solution with pH value at 5 to above mixture and mixing with 500 rpm speed and mixing for about 30 minutes;
(iv) Using homoginizer to mix with 6000 rpm speed for 2 minutes; and
(v) Taking the pre-emulsion to sonolater for cycling 6 times under 100 bar pressure.

Release Coating Bath Preparation:
(i) Adding 75 parts of water to 21.25 parts of above base emulsion coating in a beaker and mixing until homogeneous;
(ii) Adding 3.75 parts of Dow Corning Syl-off EM 7975 catalyst emulsion into above diluted emulsion and mixing for 10 minutes; and
(iii) Coating the bath on PET substrate by a coater and then thermal addition cured in oven.

Performance of Examples

Coating Process Conditions 1:
1. Substrate: 50 um PET
2. Mayer Bar: #8 (using standardized Coating Bar); Coat weight around 0.75 g/m²
3. Coating cure at 160° C./60 sec
The following Table shows the result.

| Ex. | RO[a] | Delayed RO[b] | RF | 70° C. RF | SAS | CoF |
|---|---|---|---|---|---|---|
| 1 | 87% | 92% | 7.0 | 11.8 | 94% | 0.347 |
| 2 | 92% | 94% | 7.1 | 13.5 | 93% | 0.225 |
| 3 | 90% | 92% | 6.0 | 10.4 | 92% | 0.283 |
| 4 | 91% | 93% | 6.7 | 12.2 | 93% | 0.301 |

[a] Anchorage of samples under RT without post cure
[b] Anchorage of samples aged in 70° C. 80% humidity controlled oven for 3 days Coating Process Conditions 2:
1. Substrate: 50 um PET
2. Mayer Bar: #3 (using standardized Coating Bar); Coat weight around 0.35 g/m²
3. Coating cure at 140° C./60 sec
The following Table shows the result.

| Ex. | RO[a] | Delayed RO[b] | RF | 70° C. RF | SAS |
|---|---|---|---|---|---|
| 1 | 92% | 91% | 8.9 | 13.6 | 92% |
| 2 | 97% | 92% | 8.6 | 13.8 | 92% |
| 3 | 99% | 92% | 6.6 | 11.8 | 93% |
| 4 | 97% | 94% | 6.9 | 12.1 | 93% |

[a] Anchorage of samples under RT without post cure
[b] Anchorage of samples aged in 70° C. 80% humidity controlled oven for 3 days Coating Process Conditions 3:
1. Substrate: 50 um PET
2. Mayer Bar: #6 (using standardized Coating Bar); Coat weight around 0.95 g/m²
3. Coating cure at 160° C./60 sec
The following Table shows the result.

| Ex. | RO[a] | Delayed RO[b] | RF | 70° C. RF | SAS |
|---|---|---|---|---|---|
| 5 | 94% | 86% | 7.1 | 14.4 | 92% |
| 6 | 91% | 85% | 5.5 | 13.6 | 95% |
| 7 | 93% | 88% | 5.3 | 13.7 | 92% |
| 8 | 94% | 91% | 5.5 | 13.6 | 91% |
| 9 | 95% | 91% | 5.4 | 13.1 | 93% |

[a] Anchorage of samples under RT without post cure
[b] Anchorage of samples aged in 70° C. 80% humidity controlled oven for 3 days Coating Process Conditions 4:
1. Substrate: 50 um PET
2. Mayer Bar: #3 (using standardized Coating Bar); Coat weight around 0.40 g/m²
3. Coating cure at 140° C./60 sec
The following Table shows the result.

| Ex. | RO[a] | Delayed RO[b] | RF | 70° C. RF | SAS |
|---|---|---|---|---|---|
| 5 | 87% | 87% | 12.2 | 19.3 | 92% |
| 6 | 93% | 84% | 7.0 | 16.5 | 91% |
| 7 | 91% | 89% | 7.3 | 15.7 | 93% |
| 8 | 89% | 85% | 7.0 | 16.0 | 93% |
| 9 | 92% | 86% | 6.9 | 14.7 | 94% |

[a] Anchorage of samples under RT without post cure
[b] Anchorage of samples aged in 70° C. 80% humidity controlled oven for 3 days Coating Process Conditions 5:
1. Substrate: 50 um PET
2. Mayer Bar: #6 (using standardized Coating Bar); Coat weight around 0.85 g/m²
3. Coating cure at 160° C./60 sec
The following Table shows the result.

| Ex. | RO[a] | Delayed RO[b] | RF | 70° C. RF | SAS |
|---|---|---|---|---|---|
| 10 | 88% | 81% | 6.8 | 12.8 | 93% |
| 11 | 92% | 82% | 5.7 | 12.4 | 92% |
| 12 | 90% | 84% | 5.8 | 12.6 | 91% |
| 13 | 91% | 82% | 5.6 | 12.2 | 90% |
| 14 | 87% | 88% | 5.7 | 11.9 | 89% |
| 15 | 88% | 83% | 5.6 | 12.2 | 89% |

[a] Anchorage of samples under RT without post cure
[b] Anchorage of samples aged in 70° C. 80% humidity controlled oven for 3 days

INDUSTRIAL APPLICABILITY

The silicone release coating composition according to the present invention is useful for the formation, on the surface of sheet-form substrates, of a cured coating that can provide a lower release force to sticky adhesive, and possessing excellent properties including high-speed cure, cured layer with low migration, slippery & good smooth touch of the coating surface, and good anchorage to the substrate, with lower release force at same CW. Sheet-form substrates bearing a cured coating from the aforesaid composition according to the present invention are useful for process paper, paper for wrapping or packaging tacky substances, pressure-sensitive tape, pressure-sensitive labels, and so forth.

The invention claimed is:
1. A silicone release coating composition comprising:
(A) 100 weight parts of an organopolysiloxane fluid having a viscosity at 25° C. of 50 to 10,000 mPa·s and an alkenyl content of 0.10 to 3.0 wt %;
(B) 0.5-40 weight parts of a diorganopolysiloxane represented by the average structural formula (1):

$$R^c_3SiO(R^bR^cSiO_{2/2})_{n1}(R^c_2SiO_{2/2})_{n2}SiR^c_3 \quad (1)$$

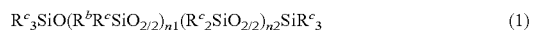

wherein $R^b$ is alkenyl group having 2 to 8 carbon atoms; $R^c$ is alkyl group having 1 to 8 carbon atoms or a phenyl group; n1 provides an alkenyl content of 0.05 to 0.80 wt %; n2 is at least 1; and n1+n2 provides this component with a viscosity at 25° C. of 20,000 to 150,000 mPa·s;
(C) an organohydrogenpolysiloxane that has a viscosity at 25° C. of 1 to 1,000 mPa·s, at least two silicon-bonded hydrogen atoms in each molecule, and an alkyl group having 1 to 8 carbon atoms or a phenyl group for its silicon-bonded organic groups, in an amount sufficient to provide a value of 0.8:1 to 5:1 for the molar ratio of silicon-bonded hydrogen atoms in this component to the alkenyl groups in components (A) and (B);

(D) a hydrosilylation reaction catalyst in a catalytic amount;
(E) a surfactant;
(F) water; and
(G) an inhibitor.

2. The silicone release coating composition according to claim 1, wherein the alkenyl content of component (B) is within a range of 0.05 to 0.50 wt %.

3. The silicone release coating composition according to claim 1, wherein component (A) is 100 weight parts of at least one organopolysiloxane fluid selected from the group consisting of: a linear organopolysiloxane, a branched organopolysiloxane, a mixture of organopolysiloxanes having different alkenyl contents of 0.10 to 3.0 wt %, and a mixture of a linear organopolysiloxane and a branched organopolysiloxane.

4. The silicone release coating composition according to claim 1, wherein component (A) is a mixture of (A-1) a polydimethylsiloxane having alkenyl groups only in its molecular terminals and (A-2) a polydimethylsiloxane having alkenyl groups in its molecular terminals and its side-chain positions.

5. The silicone release coating composition according to claim 1, wherein component (A) comprises at least one organopolysiloxane fluid having a branched structure and a viscosity at 25° C. of 50 to 10,000 mPa·s, comprising the siloxane units (i) to (iii) described below, and having a straight-chain moiety comprising a plurality of siloxane unit (ii), and a branch point comprising siloxane unit (i), wherein the terminals of the straight-chain moiety are end blocked by the siloxane unit (iii);
(i) the siloxane unit represented by the general formula $SiO_{4/2}$: 1 or more;
(ii) the siloxane unit represented by the general formula $R_2SiO_{2/2}$: 15 to 995;
(iii) the siloxane unit represented by the general formula $R^aR_2SiO_{1/2}$;
in the formulae, $R^a$ is selected from the group consisting of alkyl groups having 1 to 8 carbon atoms, alkenyl groups having 2 to 8 carbon atoms, a phenyl group, alkoxy groups having 1 to 8 carbon atoms, and a hydroxyl group, and R is selected from the group consisting of alkyl groups having 1 to 8 carbon atoms, alkenyl groups having 2 to 8 carbon atoms, and a phenyl group, wherein at least 0.10 to 3.0 wt % of the $R^a$ and R in the molecule are alkenyl groups having 2 to 8 carbon atoms and at least 50% of the total number of $R^a$ and R in the molecule are alkyl groups having 1 to 8 carbon atoms.

6. The silicone release coating composition according to claim 5, wherein component (A) comprises at least one organopolysiloxane fluid having a branched structure and represented by the average siloxane unit formula (2):

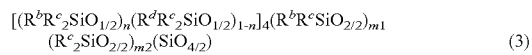   (2)

wherein $R^a$ is selected from the group consisting of alkyl groups having 1 to 8 carbon atoms, alkenyl groups having 2 to 8 carbon atoms, a phenyl group, alkoxy groups having 1 to 8 carbon atoms, and a hydroxyl group; R is selected from the group consisting of alkyl groups having 1 to 8 carbon atoms, alkenyl groups having 2 to 8 carbon atoms, and a phenyl group; at least 3 wt % of the $R^a$ and R in the molecule are alkenyl groups having 2 to 8 carbon atoms; at least 50% of the total number of $R^a$ and R in the molecule are alkyl groups having 1 to 8 carbon atoms; and m=15 to 995.

7. The silicone release coating composition according to claim 5, wherein component (A) is an organopolysiloxane having a branched structure and represented by the average siloxane unit formula (3):

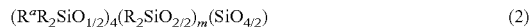   (3)

wherein $R^b$ is an alkenyl group having 2 to 8 carbon atoms; $R^c$ is an alkyl group having 1 to 8 carbon atoms or a phenyl group; $R^d$ is selected from the group consisting of alkyl groups having 1 to 8 carbon atoms, alkoxy groups having 1 to 8 carbon atoms, and a hydroxyl group; there are at least three $R^b$ in the molecule; at least 50% of the total number of $R^b$, $R^c$, and $R^d$ in the molecule are alkyl groups having 1 to 8 carbon atoms; n is 0 or 1; m1 is at least 1; m2 is at least 0; and m1+m2=15 to 995.

8. The silicone release coating composition according to claim 1, wherein component (E) comprises at least one nonionic surfactant selected from the group consisting of polyether compounds, polyether-modified silicones, water-soluble polyester compounds, water-soluble polyvinyl alcohols, and water-soluble polyvinylacetates.

9. The silicone release coating composition according to claim 1, wherein component (G) is a hydrosilylation reaction inhibitor, is noncuring at ambient temperature, and cures under the application of heat.

10. A low release force emulsion silicone release coating for films and papers yielded by curing the silicone release coating composition according to claim 1.

11. A production method of a low release force emulsion silicone release coating for films and papers, said method comprising:
applying the silicone release coating composition according to claim 1 on at least one side of a film or a paper; and
curing the applied coating at a temperature of at least 100° C.

12. The silicone release coating composition according to claim 1, wherein component (E) comprises an ethoxylated alcohol or a polyoxyethylene alkyl ether.

13. The silicone release coating composition according to claim 12, wherein component (E) further comprises a polyvinyl alcohol.

14. The silicone release coating composition according to claim 1, wherein component (E) is present in an amount of from 0.5 to 30 weight parts per 100 weight parts of component (A).

15. The silicone release coating composition according to claim 1, wherein component (F) is present in an amount of from 60 to 2000 weight parts per 100 weight parts of component (A).

16. The silicone release coating composition according to claim 1, wherein component (G) is present in an amount of from 0.05 to 2 weight parts per 100 weight parts of component (A).

17. The silicone release coating composition according to claim 1, wherein component (B) has a viscosity at 25° C. of 20,000 to 130,000 mPa·s.

* * * * *